March 30, 1965     T. H. GIFFT     3,176,208
PHASE LOCKING CONTROL DEVICE
Filed July 2, 1962     4 Sheets-Sheet 1

INVENTOR.
THOMAS H. GIFFT
BY Edward A. Sokolski
ATTORNEY

INVENTOR.
THOMAS H. GIFFT
BY Edward A. Sokolski
ATTORNEY

INVENTOR.
THOMAS H. GIFFT

United States Patent Office 3,176,208
Patented Mar. 30, 1965

3,176,208
PHASE LOCKING CONTROL DEVICE
Thomas H. Gifft, Redondo Beach, Calif., assignor to North American Aviation, Inc.
Filed July 2, 1962, Ser. No. 206,852
5 Claims. (Cl. 318—314)

This invention relates to a phase locking control device and more particularly to such a device utilizing digital techniques in conjunction with a shift register in achieving the desired control.

The phase locking of a device to a signal source is often required to assure precise control of the device in accordance with the signal source output. The phase locked device may be rotating machinery such as a motor or may be an electronic circuit such as a signal detector. The same basic servo techniques can be used in most instances regardless of the nature of the device to be controlled.

In achieving precise phase lock in the devices of the prior art, generally two separate modes of operation are utilized. The first of these brings the controlled device up to the frequency of the reference signal source. In the second mode of operation, different control circuitry is switched into the servo loop to achieve the desired phase lock condition. This type of dual mode operation has at least two disadvantages. Firstly, it requires separate circuitry for each mode of operation. Secondly, it presents problems in obtaining proper continuous control in view of the fact that it is difficult to determine the proper time to switch from the frequency control mode to the phase lock control mode with improper operation resulting should the switching be accomplished at the wrong time.

The device of this invention overcomes the shortcomings of the prior art devices by providing a single mode of operation in achieving both frequency control and phase lock with a pulse signal source. This end result is attained by utilizing a shift register which is connected to receive the output of the pulse signal source and a signal indicating the output of the controlled device. The pulse signal source output is connected to drive the shift register in one direction while the output from the controlled device is connected to drive the shift register in an opposite direction.

The output of the shift register is either a "speed up" control signal in response to one predetermined set of register conditions or a "slow down" signal in response to a second set of predetermined register conditions. This speed up or slow down signal is fed to a control device which regulates the device to be controlled to achieve the desired locking condition. When there are more pulses arriving at the shift register input from the signal source than from the controlled device, the shift register will be shifted so as to produce a speed up signal, while if there are more pulses arriving from the controlled device than from the pulse signal source, the shift register will be shifted to produce a slow down signal. When there are an equal number of pulses arriving from the signal source and the controlled device, the shift register will be shifted alternately to produce a speed up and a slow down output. Such a signal as smoothed in the control device will produce a control signal to maintain the controlled device at the desired frequency.

Phase lock of the controlled device with the signal source will be achieved when the pulses arriving at the register from the signal source and the controlled device are equispaced, i.e., when the pulses from the controlled device are arriving halfway between the time of arrival of successive pulses from the signal source. The control device will regulate the controlled device to achieve this desired end result in response to the output of the shift register without any switching from a frequency to a phase control mode. Phase lock is thus achieved with the output of the controlled device precisely lagging the signal source output by a predetermined amount.

The device of this invention thus achieves precise phase lock with a minimum of components and a simple continuous type control.

It is therefore an object of this invention to provide an improved phase locking control device.

It is a further object of this invention to achieve phase lock of a controlled device to a pulse signal source without the requirement for switching between two modes of operation.

It is a further object of this invention to provide an improved phase locking device requiring less components and of simpler configuration than prior art devices.

It is still a further object of this invention to provide an improved phase locking control device utilizing a shift register.

Other objects of this invention will become apparent from the following description taken in conjunction with the accompanying drawings of which:

Figure 6:
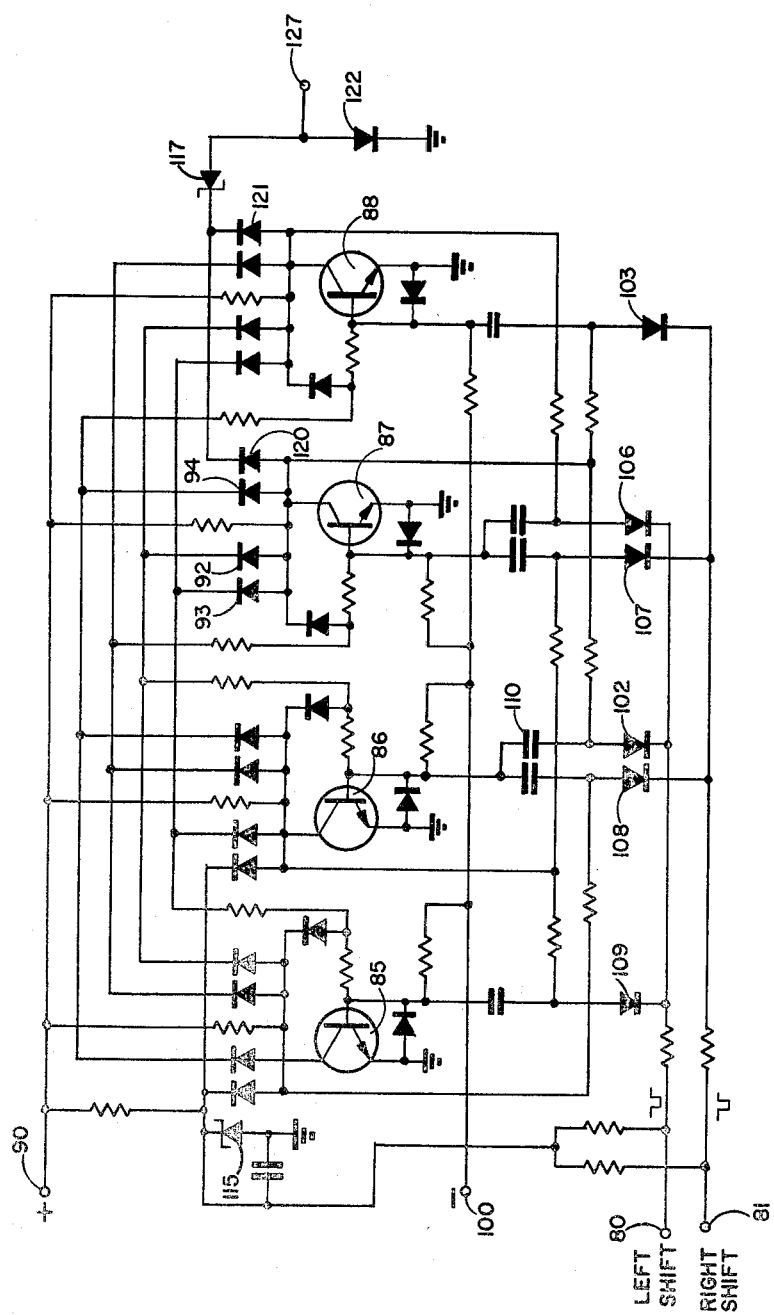

And, FIG. 6 is a schematic diagram of a shift register which may be utilized in the device of the invention.

Figure 1:
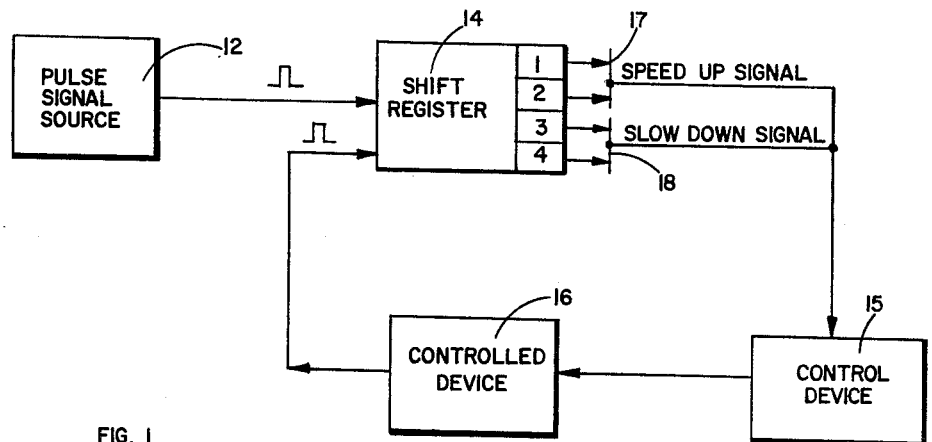
FIG. 1 is a block diagram illustrating the general features of the invention.

Referring now to FIG. 1, a block diagram illustrating basic operation of the device of the invention is shown. A pulse output signal is fed from pulse signal source 12 to shift register 14. A pulse output signal is also fed from controlled device 16 indicative of the output thereof. The output of pulse signal source 12 is connected to shift register 14 so as to produce a shift of this register towards the "1" position. The output of controlled device 16 is connected to shift register 14 so as to tend to shift the register towards the "4" position. Shift register 14 has a pair of "or" gates 17 and 18 which operate in conjunction therewith. When the digit is in shift register position 1 or 2, a first output signal is fed through "or" gate 17. On the other hand, when the digit is in shift register position 3 or 4, a second output signal is fed through "or" gate 18. Both of these signals are fed to control device 15.

The output signal fed through or gate 17 is a "speed up" signal which is of a first predetermined nature while the signal fed through or gate 18 is a "slow down" signal which is of a second predetermined nature. Control device 15 when receiving a "speed up" signal will produce a control signal for controlled device 16 so as to speed up or increase the frequency or advance the phase of its output, while the opposite type of control is produced when a "slow down" signal is fed to control device 15. Such speed up or slow down control is, of course, reflected in the output of controlled device 16 which is fed to shift register 14. Thus, when the shift register has been shifted to the 1 or 2 position which is indicative of the arrival of a greater number of pulses from pulse signal source 12 than from controlled device 16, a speed up signal will be fed through "or" gate 17 from the shift register 14 to the control device 15 which will tend to increase the frequency of the output of controlled device 16. If there are more pulses arriving from the controlled device 16 than from the pulse signal source 12, the shift register will be driven to the 3 or 4 position which will result in a slow down signal being fed through or gate 18 to control device 15 which will tend to decrease the frequency of the output of controlled device 16.

In starting the device from rest, the following occurs: Initially there are no pulses being fed from controlled device 16 to the shift register and only pulses from pulse signal source 12 are being fed thereto. The pulses from pulse signal source 12 will therefore shift the shift register all the way to position 1. It is to be noted that the shift register, once it has been shifted to position 1 or 4, will stay in these extreme positions until a shift pulse arrives to shift towards the opposite direction. When the shift register is in position 1, therefore, additional pulses from pulse signal source 12 will have no effect other than to keep the shift register in this position. As controlled device 16 speeds up, pulses will be fed therefrom to the shift register. As the correct speed is approached, the shift register will start shifting between positions 1 and 2. With the register in position 1 or 2 the controlled device will continue to accelerate until it is producing an output slightly higher in frequency than the signal source output. There will then be one more pulse coming from control device 16 than from the signal source and this will cause a shift to the number 3 position which will produce a slow down signal. The shift register will then start to be shifted between positions 2 and 3 with signals arriving alternately from the pulse signal source and the controlled device.

The output of the controlled device will then be at the same frequency as that of the pulse signal source. However, the desired phase lock will not be achieved until the shift register is in the 2 and 3 positions for equal time intervals. This condition will only be achieved when the signals from the signal source and from the controlled device are equispaced with the signals from the controlled device arriving halfway in-between successive signals from the signal source. This phase locking operation will be automatically achieved by appropriate speed up or slow down control of controlled device 16. So, for example, if the pulses from controlled device 16 should be arriving too soon after the pulses from signal source 12, shift register 14 will be feeding a "slow down" signal for a longer time interval than a "speed up" signal, the net effect of which will be to slow down the output of controlled device 16. This will tend to make the output pulses from controlled device 16 arrive a longer time interval after the arrival of the output of signal source 12. When the "speed up" and "slow down" signals are being fed to the control device 15 for equal time intervals, which condition will only incur when the input pulses from the shift register are equispaced, the desired phase locking condition will have been achieved.

Figure 2:
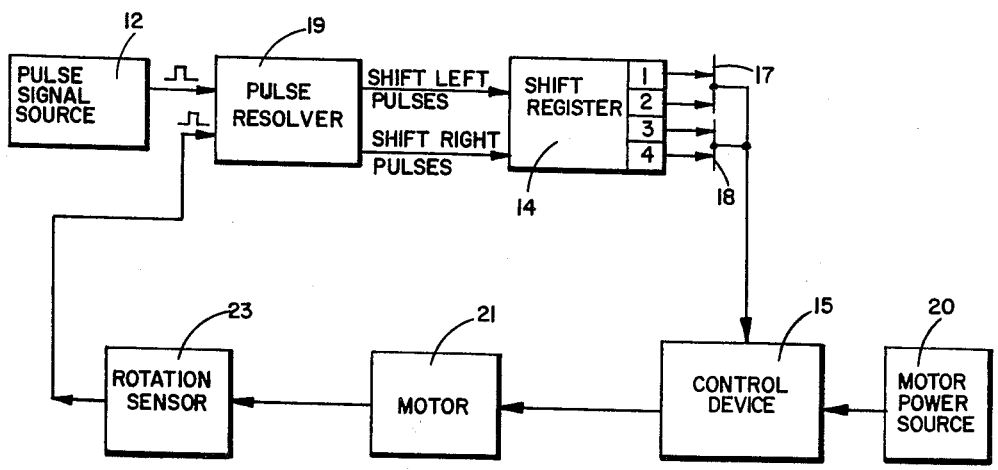
FIG. 2 is a block diagram illustrating an embodiment of the device of the invention as applied to the control of a motor.

Referring now to FIG. 2, a block diagram illustrating the device of the invention as incorporated into a motor control system is shown. The embodiment illustrated in FIG. 2 operates similarly to that of FIG. 1 except for the addition of pulse resolver 19 and the specific elements peculiar to the control of the rotation speed of a motor.

In the embodiment of FIG. 2, pulse resolver 19 is added between pulse signal source 12 and shift register 14 to take care of the situation where pulses from pulse signal source 12 and rotation sensor 23 should arrive spaced so closely together so that the shift register is incapable of detecting the second pulse to arrive in view of its inability to recover soon enough after the arrival of the first pulse. The particular shift register used may, for example, only have a resolution capability of 20 microseconds and may not be able to detect pulses arriving closer than that. This would mean that if a shift left pulse and a shift right pulse were to be fed to the shift register within the 20 microsecond period the register would only respond to the first pulse arriving and would be incapable of responding to the second pulse. There, therefore, would be an erroneous shift in response to the first pulse to arrive in view of the fact that no shift would be produced in response to the second of these pulses.

Pulse resolver 19 effectively eliminates any signal at all from being fed to shift register 14 should successive pulses be fed thereto, one from pulse signal source 12 and the other from rotation sensor 23, within a time interval predetermined in accordance with the resolution capability of shift register 14. The operation of pulse resolver 19 will be explained further on in the specification in connection with FIGS. 3–5.

In the device illustrated in FIG. 2, the current output from motor power source 20 is controlled by control device 15 to regulate the speed of motor 21. The current passed through control device 15 from power source 20 is regulated in accordance with the signal fed from shift register 14 through "or" gates 17 and 18. Rotation sensor 23 which may be an electrical pickoff or may involve an electrical switching device mechanically linked to motor 21 produces an output pulse with each rotation of motor 21. This output pulse is fed to pulse resolver 19. Pulse resolver 19 has two outputs, one a series of shift left pulses which will tend to shift register 14 towards the 1 position and shift right pulses which tend to shift register 14 towards the 4 position. As already explained in connection with FIG. 1, the shift register output is either a "speed up" or "slow down" signal depending upon the shift condition of its digits.

Figure 3:
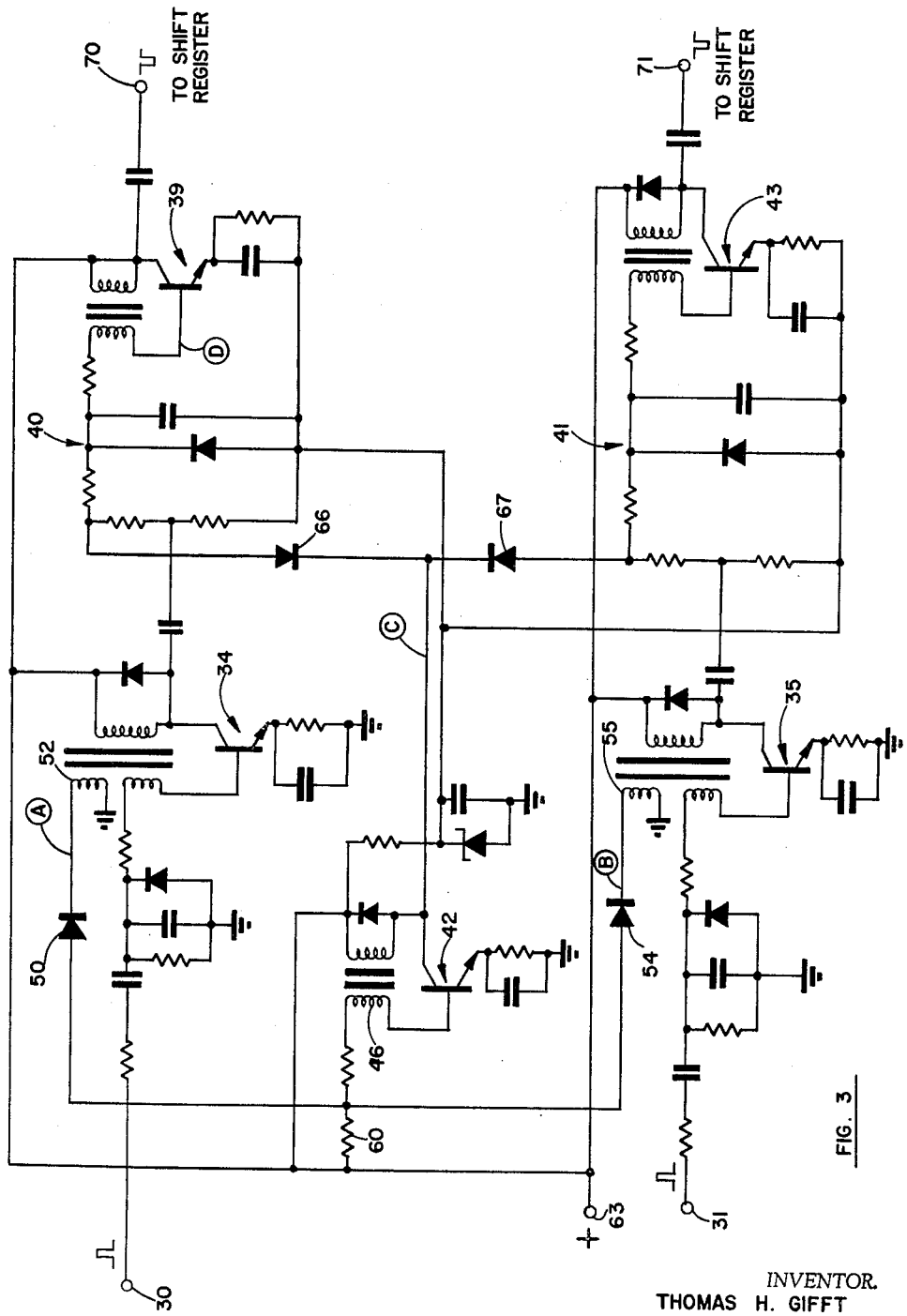
FIG. 3 is a schematic diagram of a pulse resolver which may be utilized with the device of the invention.

Referring now to FIG. 3, a pulse resolver which may be utilized in the device of the invention is illustrated. Signals from pulse signal source 12 are fed in at terminal 30 while signals from rotation sensor 23 are fed in at terminal 31. The pulses arriving at terminal 30 are fed to drive blocking oscillator stage 34 into conduction. As is well known in the art, a blocking oscillator is normally biased to cutoff and when keyed to conduction will conduct through one cycle at its resonant frequency and then will return to a cutoff condition. The blocking oscillator produces as an output signal a pulse having a time duration which is a function of its circuit design characteristics. The time duration of the output pulses of blocking oscillator 34 is designed to be greater than the minimum resolution capability of the shift register.

The pulses fed to terminal 31 from rotation sensor 23 are fed to drive blocking oscillator circuit 35 which is identical in characteristics to blocking oscillator circuit 34.

Figure 4:
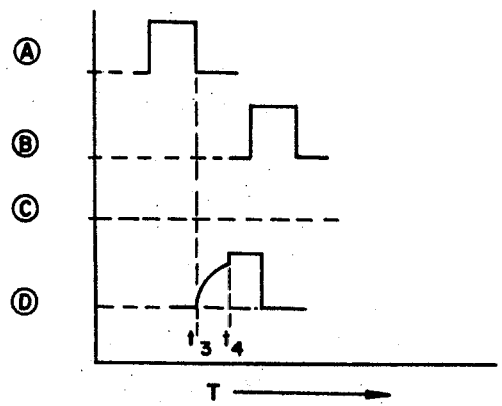
FIGS. 4 and 5 are waveform drawings showing the waveforms at various points of the circuit illustrated in FIG. 3.

FIG. 4 illustrates the pulses generated by blocking oscillator circuits 34 and 35 in the situation where there is no overlap between the pulses, i.e., the two blocking oscillators are not conducting simultaneously. This is the situation where the input pulses are arriving at a time separation greater than the pulse widths of the blocking oscillator outputs which as noted are designed to be greater than the minimum resolution capability of the shift register. The pulse developed in blocking oscillator circuit 34 is illustrated in line A of FIG. 4 while the pulse developed by blocking oscillator 35 is illustrated in line B of this same figure.

The output of blocking oscillator circiut 34 is fed through delay line 40 so that the differentiated positive going trailing edge thereof drives blocking oscillator circuit 39 into conduction. Delay line 40 is designed to delay the firing of blocking oscillator circuit 39 for a period at least equal to the pulse duration of the output pulse from blocking oscillator circuit 34 which as already noted is predicated on the minimum resolution capability of the shift register. As shown in line D of FIG. 4 which illustrates the trigger pulse fed to blocking oscillator circuit 39, the firing of this blocking oscillator is delayed after the trailing edge of the pulse output of oscillator 34 for the time interval $T_3$–$T_4$. Blocking oscillator circuit 43 operates similarly in response to the output of blocking oscillator circuit 35.

Blocking oscillator circuit 43 (FIG. 3) has its base input drive winding 46 connected through diode 50 to blocking oscillator winding 52 which is grounded. This same input winding of blocking oscillator 42 is also connected through diode 54 to winding 55 of blocking oscillator circuit 35. The common connection between diodes 50, 54 and the input drive circuit for blocking oscillator 42 is connected through resistor 60 to terminal 63 to which a positive voltage source (not shown) is connected. When either blocking oscillator circuit 34 or 35 is in the cutoff condition, the input circuit of blocking oscillator 42 is effectively grounded through either diode 50 and winding 52 or diode 54 and winding 55. Therefore with no overlap in the conduction of blocking oscillator circuits 34 and 35, the input circuitry to blocking oscillator 42 will be maintained at ground potential, and this blocking oscillator will therefore be kept biased to cutoff. Therefore, as indicated in line C of FIG. 4, there will be no output signal from this blocking oscillator where there is no overlap in the conduction of blocking oscillators 34 and 35.

Figure 5:
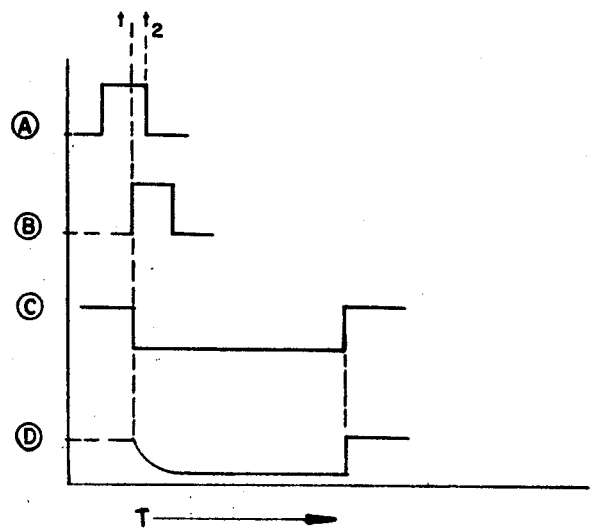

FIG. 5 illustrates what happens when there is any overlap between the conduction of blocking oscillators 34 and 35. As can be seen, during the interval when such overlap is occurring, the pulse shown on line A will back bias diode 50 while the pulse shown on line B will simultaneously back bias diode 54. This will remove the ground path from the input circuit of blocking oscillator 42. The positive potential fed from terminal 63 will therefore fire blocking oscillator 42 to produce a negative output signal as indicated on line C. The output signal from blocking oscillator 42 as indicated on line C is fed through diodes 66 and 67 to delay lines 40 and 41 respectively. These signals are delayed by the delay lines but produce a cutoff signal as shown in line D at the inputs to blocking oscillators 39 and 43 preventing them from ever firing in response to the input pulses fed to terminals 30 and 31. In this manner, output pulses are prevented from ever appearing at terminals 70 and 71 when input pulses arrive at terminals 30 and 31 in less than a predetermined time interval.

Referring now to FIG. 6, a shift register which may be utilized in the device of the invention is illustrated. Left shift pulses are fed from terminal 70 of the pulse resolver to terminal 80 of the shift register while right shift pulses are fed from terminal 71 of the pulse resolver to terminal 81 of the shift register. The shift register comprises four shift units 85-88. These shift units are interconnected so that at all times one is cutoff while the other three are conducting. When the register is first turned on, one of these units, at random, will assume a non-conducting state. Let us assume, for example, that unit 87 is this non-conducting unit. It can be seen that with unit 87 non-conducting, the potential at the collector of this transistor will approach the positive potential at terminal 90. This positive potential appearing on the collector of transistor 87 will be coupled through diodes 92, 93, and 94 to the base circuits of transistors 86, 85, and 88 respectively to maintain these transistor units in a conducting state. Transistor 87 will be maintained on a cutoff condition by the negative potential fed to terminal 100 which is connected to the base circuit of this transistor unit.

With transistor unit 87 at cutoff and transistor units 85, 86, and 88 conducting, there will be a positive potential at the anode of diodes 102 and 103 and approximately zero potential at the anodes of diodes 106, 107, 108, and 109. This can be verified by noting that diodes 106, 107, 108, and 109 are connected to the collector circuits of conducting transistors 85, 86, and 88 while the anodes of diodes 103 and 102 are both connected to the collector of the non-conducting transistor unit 87. The cathodes of diodes 102, 103, 106, 107, 108, and 109 are all connected through appropriate biasing circuits to the positive potential established by zener diode 115.

Let us assume now that a left shift pulse should arrive at terminal 80. This pulse is fed to the cathodes of diodes 102, 106, and 109. Such an input pulse will not pass through diodes 106 or 109 in view of the fact that the anodes of these diodes are substantially at ground potential by virtue of their connections to the collectors of conducting transistors and the cathodes of these diodes have a positive potential on them sufficient to override the negative input shift pulse. This left shift pulse will, however, be passed through diode 102 in view of the fact that this diode has a positive potential on its anode by virtue of its connection to the collector of a cutoff transistor, and this negative going shift pulse appearing at the diode's cathode will therefore be sufficient to produce conduction thereof. This negative pulse is fed through capacitor 110 to the base circuit of transistor 86 driving it to cutoff. When transistor 86 is cutoff it will cause transistor 87 to conduct as well as transistors 85 and 88 in the same fashion as described in connection with the operation of transistor unit 87. A left shift pulse on line 80 will therefore produce a shift of one unit to the left, namely it will cause transistor unit 86 to assume the cutoff condition while maintaining the other units at conduction.

If with the shift again in unit 87 (that is with this unit cutoff), a right shift pulse should arrive at terminal 81, this pulse will cause transistor unit 88 to go to cutoff with the other three units conducting in the same general fashion as explained in connection with the left shift. This occurs in view of the fact that the anode of diode 103 has a positive bias on it by virtue of its connection to the collector circuit of transistor 87 so that it will conduct on the arrival of a negative pulse at its cathode.

The shift units 85-88 are interconnected so that there can be a one unit shift to the left or the right with each input shifting pulse, the direction of such shift being determined by which line the input pulses are received on. With the shift in unit 88 (that is with this unit non-conducting), an additional right shift pulse at terminal 81 will have no effect in view of the fact that none of the other three transistors will have their input diodes biased so as to be made to conduct on the arrival of such a pulse. Similarly the arrival of a left shift pulse with the shift in unit 85 will have no effect. Thus, when the shift arrives at the end of the line in either direction, shifting can only be accomplished in the opposite direction. Zener diode 115 is utilized to provide a predetermined fixed bias at the cathodes of diodes 102, 103, and 106-109 to assure proper response to the input signals. Zener diode 117 is utilized to generate a precise output signal. Zener diode 117 will be fired when the shift is in either unit 87 or 88, that is when either of these units is in the non-conducting state. As can be seen, when such is the case, a positive potential will appear between the cathode and the anode of zener diode 117 as presented through diode 120 when transistor unit 87 is non-conducting and diode 121 when transistor unit 88 is non-conducting. Thus a current flow will be produced through zener diode 117 and diode 122 to provide an output signal indicating that the shift is in units 87 or 88. When the shift is in units 85 or 86, zener diode 117 is kept non-conducting and no output current signal is produced.

The output control signal is fed from terminal 127 to an appropriate regulator circuit which utilizes this signal to speed up the motor while zener diode 117 is conducting and to slow down the motor when it is non-conducting. An integrating circuit may be used in this regulator so that the average conduction of zener diode 117 is utilized to determine the speed of the motor. With zener diode conducting and non-conducting for equal intervals, an average regulator current output will be maintained to precisely phase lock the controlled device to the signal source. Appropriate amplified and regulator circuits capable of utilizing the output appearing at terminal 127 are well known in the art and may include a device such as a pulse width modulator or a simple series transistor regulator connected to control the current fed from the power source to the motor or other device to be controlled.

The device of this invention thus provides a simple yet highly effective device for phase locking a device to be controlled such as a motor to a pulse signal source. Frequency and phase lock are attained without the necessity of switching from one mode of operation to another, thus providing continuous, precise control, and minimizing the circuitry required to achieve the desired end results.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A device for phase locking a device to be controlled with a pulse signal source output comprising,
 a shift register connected to receive said pulse signal source output and a signal indicating the output of said device to be controlled,
 said pulse signal source output being connected to drive said shift register in one direction,
 said signal indicating the output of said device to be controlled connected to drive said shift register in a direction opposite said one direction, and
 control means interposed between said shift register and said device to be controlled for regulating the input to said device to be controlled in response to said shift register output,
 said control means having an output consisting solely of one or the other of two fixed magnitudes, one in response to a first plurality of predetermined shift register conditions and a second in response to a second plurality of predetermined shift register conditions.
2. The device as recited in claim 1 wherein said first plurality of predetermined shift register conditions results in a speed up signal being fed to said control means and said second plurality of predetermined shift register conditions results in a slow down signal being fed to said control means.
3. A device for phase locking a device to be controlled with a pulse signal source output comprising,
 a shift register connected to receive a signal in accordance with said pulse signal source output and a signal indicating the output of said controlled device to be controlled,
 said pulse signal source output being connected to drive said shift register in one direction,
 said signal indicating the output of said device to be controlled being connnected to drive said shift register in a direction opposite said one direction,
 control means interposed between said shift register and said device to be controlled for regulating the input to said device to be controlled in response to said shift register output,
 said control means having an output consisting solely of one fixed magnitude in response to a first plurality of predetermined shift register conditions and an output consisting solely of a second fixed magnitude in response to a second plurality of predetermined shift register conditions, and
 pulse resolver means interposed between said pulse signal source and said shift register and said device to be controlled and said shift register for passing signals to said shift register only when the signal from said pulse signal source and the output from said device to be controlled are separated by at least a predetermined minimum time interval, said pulse resolver means preventing pulses from either said pulse signal source or the output of said device from being passed when not separated by at least a predetermined minimum time.
4. The device as recited in claim 3 wherein said shift register has at least four positions.
 said first set of predetermined register conditions being satisfied when said register is in one of a first half of said positions,
 said second set of predetermined register conditions being satisfied when said register is in one of a second half of said positions.
5. A device for phase locking rotation of a motor to a reference source signal comprising,
 means for sensing rotation of said motor,
 pulse resolver means connected to receive the outputs of said sensing means and said reference source, said pulse resolver means preventing pulses of either said reference source signal or from said means for sensing, from passing when not separated by at least a predetermined minimum time,
 a shift register connected to receive the output of said pulse resolver means,
 said sensing means output being connected to drive said shift register in one direction,
 said reference source output being connected to drive said shift register in a direction opposite said one direction,
 a motor power source, and
 speed regulator means responsively connected to said shift register interposed between said power source and said motor for controlling the current fed to said motor to synchronize rotation thereof with said reference source signal, said speed regulator providing an output consisting solely of one or the other of two fixed magnitudes, one of which causes said motor to increase speed and the other of which causes said motor to decrease speed.

References Cited by the Examiner

UNITED STATES PATENTS

| | | | |
|---|---|---|---|
| 2,537,427 | 1/51 | Seid et al. | 318—28 |
| 2,829,323 | 4/58 | Steele | 318—28 |
| 2,876,365 | 3/59 | Slusser | 307—88.5 |
| 2,932,778 | 4/60 | Curtis | 318—318 |
| 2,996,649 | 8/61 | Leslie | 318—314 |
| 3,005,917 | 10/61 | Hofmann | 307—88.5 |
| 3,048,711 | 8/62 | Hofmann | 307—88.5 |
| 3,064,173 | 11/62 | Breen et al. | 318—314 |
| 3,070,713 | 12/62 | Leightner | 307—88.5 |

JOHN F. COUCH, *Primary Examiner.*